United States Patent
Lugt et al.

(10) Patent No.: US 12,140,184 B2
(45) Date of Patent: Nov. 12, 2024

(54) SEALED BEARING ASSEMBLY

(71) Applicants: Aktiebolaget SKF, Gothenburg (SE); VESTA SI SWEDEN AB, Ljungaverk (SE)

(72) Inventors: Pieter Martin Lugt, Vianen (NL); Santosh Limaye, Ljungaverk (SE)

(73) Assignees: Aktiebolaget SKF, Gothenburg (SE); VESTA SI SWEDEN AB, Ljungaverk (SE)

(*) Notice: Subject to any disclaimer, the term of this patent is extended or adjusted under 35 U.S.C. 154(b) by 164 days.

(21) Appl. No.: 17/623,905

(22) PCT Filed: Jul. 7, 2020

(86) PCT No.: PCT/EP2020/069077
§ 371 (c)(1),
(2) Date: Dec. 30, 2021

(87) PCT Pub. No.: WO2021/008936
PCT Pub. Date: Jan. 21, 2021

(65) Prior Publication Data
US 2022/0364598 A1    Nov. 17, 2022

(30) Foreign Application Priority Data
Jul. 17, 2019   (DE) .................. 102019210520.3

(51) Int. Cl.
*F16C 33/66* (2006.01)
*F16C 19/38* (2006.01)
(Continued)

(52) U.S. Cl.
CPC .......... *F16C 33/6625* (2013.01); *F16C 19/38* (2013.01); *F16C 33/6607* (2013.01);
(Continued)

(58) Field of Classification Search
CPC ........ F16C 19/38; F16C 33/6603–6633; F16C 33/726; F16C 33/7853; F16C 35/067;
(Continued)

(56) References Cited

U.S. PATENT DOCUMENTS

| | | |
|---|---|---|
| 5,785,390 A | 7/1998 | Gold et al. |
| 6,007,251 A | 12/1999 | Hayashida et al. |

(Continued)

FOREIGN PATENT DOCUMENTS

| | | |
|---|---|---|
| CN | 1105801 A | 7/1995 |
| CN | 105829748 A | 8/2016 |

(Continued)

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

Disclosed is a sealed bearing arrangement that provides at least a bearing with an outer ring and an inner ring, which are rotatable to each other and form a rolling chamber between each other, in which a set of rolling elements. A lubricant is encompassed in the rolling chamber and the rolling chamber is sealed off from an environment by at least one sealing element. The inner ring, the outer ring and/or the sealing element includes at least one opening for providing a fluid passage through the sealing element. The bearing is arranged in a housing that is adapted to seal off the bearing from an outside environment. A lubricant is encompassed inside the housing. The housing including the at least one opening for providing a fluid passage from the inside of the housing to the outside. The opening is fluid tightly connected to an oxygen removing element and/or to a gas tank, which provides an oxygen poor to free fluid flow to the rolling chamber.

8 Claims, 2 Drawing Sheets

(51) Int. Cl.
 *F16C 33/78* (2006.01)
 *F16C 35/067* (2006.01)
 *F16C 41/00* (2006.01)

(52) U.S. Cl.
 CPC ........ *F16C 33/7853* (2013.01); *F16C 35/067* (2013.01); *F16C 41/00* (2013.01); *F16C 2300/42* (2013.01)

(58) Field of Classification Search
 CPC .............. F16C 41/005; F16C 2326/02; B60B 27/0073; B60B 2900/561
 See application file for complete search history.

(56) References Cited

U.S. PATENT DOCUMENTS

| | | | |
|---|---|---|---|
| 2010/0220943 A1* | 9/2010 | Mikami | F16C 33/785 384/13 |
| 2012/0219246 A1 | 8/2012 | Shimizu et al. | |
| 2014/0363113 A1 | 12/2014 | Katsaros | |
| 2019/0070900 A1* | 3/2019 | Konishi | G01P 1/02 |
| 2019/0084350 A1* | 3/2019 | Nakatsuji | F16C 33/78 |

FOREIGN PATENT DOCUMENTS

| | | |
|---|---|---|
| DE | 102012217030 A1 | 3/2014 |
| GB | 1413118 A | 11/1975 |
| JP | 2003287037 A | 10/2003 |
| JP | 2005325310 A | 11/2005 |
| JP | 2007321917 A | 12/2007 |
| JP | 2008032151 A | 2/2008 |
| JP | 2008111057 A | 5/2008 |
| WO | 2008105377 A1 | 9/2008 |

* cited by examiner

SEALED BEARING ASSEMBLY

CROSS-REFERENCE TO RELATED APPLICATIONS

This application is the U.S. National Stage of International Application No. PCT/EP2020/069077, filed on Jul. 7, 2020, which claims priority to German patent application no. 102019210520.3, filed on Jul. 17, 2019.

FIELD OF THE INVENTION

The present invention relates to a sealed bearing arrangement including at least one bearing having an outer ring and an inner ring between which a rolling chamber is defined.

BACKGROUND OF THE INVENTION

During operation the temperature in the bearing increases which results in an expansion of the air which is present in the rolling chamber and/or housing of the bearing. A part of it will therefore leave the bearing. Cooling down will cause an inverse process. This in turn, resides in a certain air exchange in the bearing assembly during which fresh oxygen is transported from the outside to the inside. Under transient running conditions, i.e., conditions where the speed or load will vary, the heat development and therefore bearing temperature will vary over time, leading to a continuous supply of oxygen. The constant supply of fresh oxygen leads to a constant oxidation of the lubricant, which ends in a degradation of the lubricant and a decreased service life. Consequently, the lubricant has to be exchanged frequently, which requires frequent service intervals, downtimes of the bearing and increases the costs.

Consequently, it is an object of the present invention to provide a bearing assembly with improved lubrication properties.

This object is solved by a solved by a sealed bearing arrangement as claimed and disclosed in this paper.

SUMMARY OF THE INVENTION

In the following a sealed bearing arrangement is disclosed, wherein the bearing arrangement comprises at least a bearing with an outer ring and an inner ring between which of rolling chamber is defined. In the rolling chamber at least one set of rolling elements is arranged. The bearing may be accommodated in a housing which is adapted to seal off the bearing from an outside environment. Alternatively or additionally, the rolling chamber is sealed off from an environment by at least one sealing element. Further, a lubricant, such as grease, is included in the rolling chamber and/or in the inner space of the housing.

For improving the lubrication properties and reduce lubrication degradation due to oxidation, the inner ring, the outer ring, the sealing element and/or the housing further comprises at least one opening for providing a fluid passage through the inner ring and/or the outer ring and/or the sealing element and/or into the inner space of the housing, wherein the opening is fluid tightly connected to an oxygen removing element and/or to a gas tank, which provides an oxygen poor to free fluid to the rolling chamber and/or the inner space of the housing.

Due to the oxygen removing element and/or the gas tank providing an oxygen poor to free fluid, the exposure of the lubricant to oxygen is largely reduced, which in turn increases the service life of the lubricant and thereby of the bearing assembly.

According to a further preferred embodiment, the oxygen removing element comprises a material which is adapted to absorb oxygen and release absorbed oxygen based on a change of at least one physical parameter which impacts on the oxygen removing element. This allows for removing oxygen from the rolling chamber and/or the inside of the housing as will be described in detail below.

Thereby, the physical parameter may be temperature and/or pressure.

It is further preferred, if the oxygen removing element comprises a honeycomb structure or similar structure or structure, which generates a large surface area. This allows for a maximum active area for absorbing/desorbing oxygen in an element which requires a minimum of space.

According to a further preferred embodiment, the oxygen removing element comprises zeolite and/or activated carbon and/or activated graphite. These materials are known to absorb oxygen based on temperature and also provide a structure with a maximized active surface compared to the overall size.

According to a further preferred embodiment, the gas tank comprises nitrogen. Nitrogen is known to be inert to react with any lubricant used in bearing applications.

According to a further preferred embodiment the lubricant is grease.

The oxygen removal in such a sealed bearing works as follows:

During operation of the bearing the bearing elements are heated. Thus, also the air inside the rolling chamber or the housing is heated. Due to this heating the air expands and increases the air pressure in the housing/rolling chamber. Due to this pressure increase, the "warm" air streams through the venting holes/openings and thereby also through the oxygen removing element. In case that oxygen removal of the material of the oxygen removing element is triggered by e.g. temperature, the increased temperature in the element hinders the absorption of oxygen and/or may allow for a desorption of oxygen in the oxygen removing element, so that oxygen is transported out of the bearing/housing and also out of the oxygen removing element.

When the operation is terminated or when the speed and/or load on the bearing is reduced and the bearing arrangement is cooling down, the bearing is sucking up air through the venting holes/openings. Thanks to the oxygen removing element arranged in the opening, oxygen will be absorbed to the oxygen removing element and the oxygen cannot enter the rolling chamber/housing. This is particularly possible, if in the "hot" phase, the oxygen is desorbed from the surface of the oxygen removing element and transported to the outside environment, which leaves the oxygen removing element free for absorbing fresh oxygen. The result should ultimately be an oxygen free gas environment inside of the bearing/housing so that oxidation of the lubricant may be reduced and lubricant service life may be increased.

The same concept applies for the gas tank where oxygen which is initially present in the air inside of the bearing is replaced by the gas which is provided by the gas tank. This also reduces oxidation of the lubricant inside the housing/rolling chamber, as the supply of fresh oxygen is terminated.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figures show.

In the following same or similar functioning elements are indicated with the same reference signs.

DETAILED DESCRIPTION OF THE INVENTION

Figure 1:
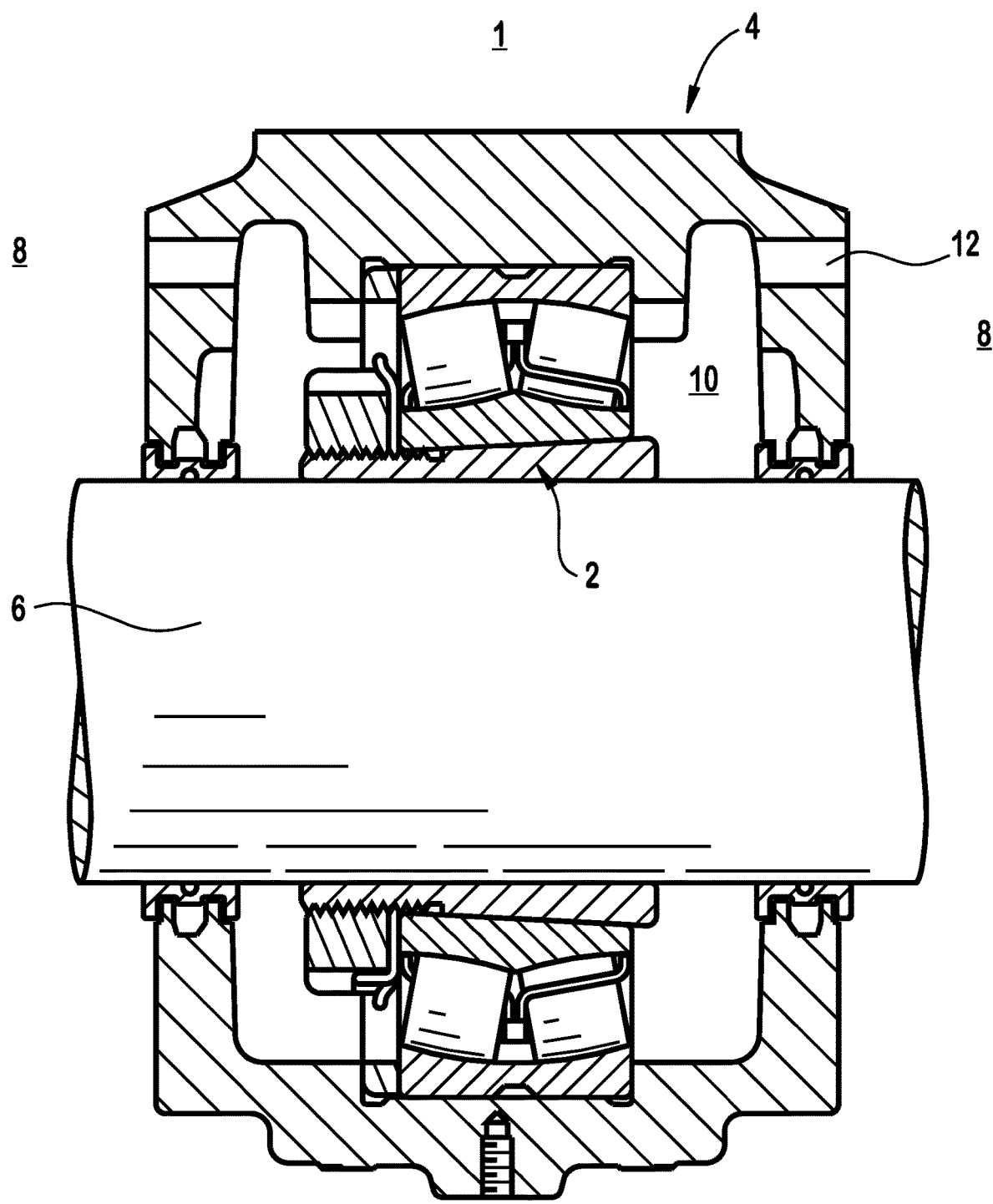
FIG. 1: a schematic sectional view of a bearing assembly according to a first embodiment of the present invention.

FIG. 1 shows a schematic sectional view of a bearing assembly 1. The bearing assembly 1 comprises a bearing 2 which is housed in a housing 4. The bearing 2 supports a shaft 6. As can be further seen in FIG. 1, the housing 4 seals off the bearing 2 from an outside environment 8. The in the space 10 of the housing 4, in which also the bearing 2 is accompanied, a lubricant, such as the grease, is provided.

Figure 2:
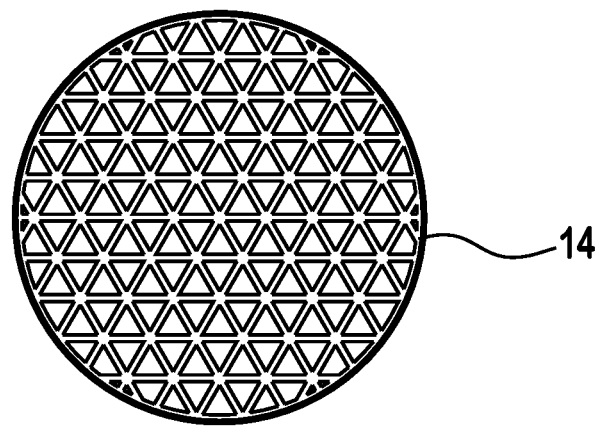
FIG. 2: a schematic sectional view of an oxygen removing.

For allowing a pressure equalization with the outside environment 8, the housing 4 is further equipped with openings 12, which allow an air flow from the inside of the housing to the outside and vice versa. Since such an airflow also provides fresh oxygen to the inner space 10, which in turn might oxidized the lubricant, at least one oxygen removing element 14 is arranged in the/at the opening 12. The oxygen removing element 14 is illustrated in FIG. 2 and preferably has a honeycomb structure. Such are oxygen removing element may be made from zeolite, activated carbon, activated graphite or any other oxygen absorbing/desorbing material with a surface increasing structure.

The oxygen removing feature of such bearing assembly 1 works as follows:

During operation the bearing 2 heats up, which in turn increases also the temperature inside of the housing 4. Consequently, also the air and/or the lubricant present inner space 10 of the housing 4 heats up which results in an expansion and a pressure increase. Due to the pressure increase air is pressed through the opening 12 and thereby through the oxygen removing element 14. Preferably, the oxygen removing element has an oxygen desorbing property with increased temperature so that oxygen is transported from the inner space 10 of the housing 10 as well as from the oxygen removing element 14 to the outside environment 8.

As soon the operation of the bearing 2 is terminated, the temperature decreases and the bearing assembly 1 cools down. This in turn results in a pressure decrease in the inner space 10 of the housing 4 which reverses the gas flow through the opening 12 and the oxygen removing element 14. In case the oxygen removing element is made e.g. from a material with oxygen removing properties at lower temperatures, then the oxygen is removed from the air streaming through the gas removing element 14 and the opening 12. Consequently, the oxygen amount in the inner space 10 of the housing 4 is reduced, which in turn reduces the oxidation of the lubricant inside the housing and increases the service life of the lubricant and/or of the bearing.

Figure 3:
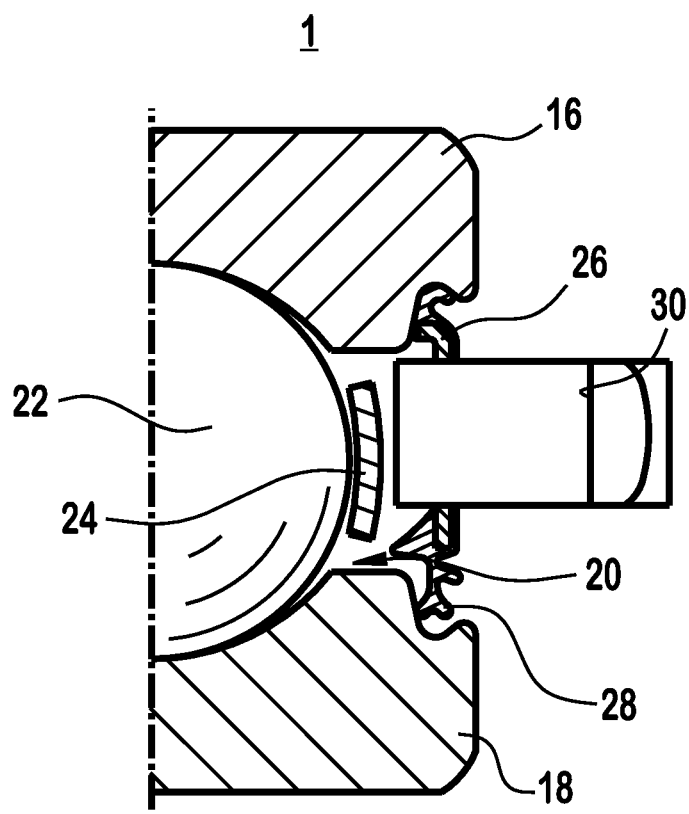
FIG. 3: a schematic sectional view of a bearing assembly according to a second embodiment of the present invention.

FIG. 3 shows a sectional view of a further embodiment of a bearing assembly of the present invention. A bearing assembly 1 is illustrated having an outer ring 16 and an inner ring 18 which define a rolling chamber 20 between each other. In the rolling chamber 20 rolling elements 22 are arranged. As can be further seen from FIG. 3, the rolling elements 22 are maintained by a cage 24 in a regularly spaced apart condition and the rolling chamber 20 is sealed off from the environment 8 by a sealing element 26. In the illustrated embodiment, the sealing element 26 is fixed to the outer ring 16 and in gliding contact to the inner ring 18 with lip 28.

During operation of the bearing 1, the temperature in the rolling chamber 20 increases which results in a pressure increase inside of the rolling chamber 20. In known bearings such a pressure increase triggers a lifting off of the lip 28 of the sealing element 26 from the gliding surface of the inner ring 18 for balancing the pressure difference and releasing air from the rolling chamber 20. After the operation of the bearing has been stopped the bearing cools down, which results in low pressure in the rolling chamber 20, which is also balanced by air being transported over the sealing lip 28.

For avoiding the lifting motion of the sealing lip 28 triggered by the pressure differences, it is proposed to provide an opening in the sealing element 26 in which at oxygen removing element 14 is arranged and/or with which a gas tank 30 is connected. This allows for an air exchange over the oxygen removing element, which reduces the overall oxygen the amount in the rolling chamber, as explained above. Instead of providing the opening in the sealing element, it is also possible to provide the opening in the inner and/or altering.

In case a gas tank is fluid tightly connected to the opening of the sealing element, the air is not equipped with fresh oxygen from the outside environment 8, but with an oxygen free gas, such as nitrogen, which also reduces the oxidation of the lubricant in the rolling chamber. The size of the gas tank may be adapted to the expected pressure differences and the expected air exchange through the sealing element. Of course, such a gas tank may also be provided to the housing illustrated in FIG. 1 and in addition to any oxygen removing element.

This embodiment has a further benefit as the extensive wear due to the lifting off motion of the sealing lip is avoided. This in turn allows for an increase service life of the sealing element and therefore of the bearing.

As can be further seen in the FIG. 1 and FIG. 3, the bearing is not restricted to a certain embodiment of the bearing so that any bearing, e.g. a roller bearing, such as a tapered roller bearing or any kind of ball bearing, may be used with this invention.

In summary the oxygen removing element as well as the gas tank allows for an air exchange in the bearing without adding fresh oxygen to the inside of the bearing or the housing. This in turn, allows for the reduced oxidation of the lubricant and thereby for an increased service life of the grease/the bearing.

The invention claimed is:

1. A sealed bearing arrangement comprising:
   at least a bearing with an outer ring and an inner ring that are rotatable with respect to each other and form a rolling chamber between each other, in which a set of rolling elements is arranged, wherein a lubricant is encompassed in the rolling chamber and the rolling chamber is sealed off from an environment by at least one sealing element, wherein the inner ring, the outer ring and/or the sealing element further comprises at least one opening for providing a fluid passage through the boundary of the sealed off rolling chamber wherein the opening is fluid tightly connected to an oxygen removing element, which provides an oxygen sink for a free fluid contained within the rolling chamber, wherein the oxygen removing element comprises zeolite and/or activated carbon and/or activated graphite.

2. A sealed bearing arrangement comprising at least a bearing with an outer ring and an inner ring, that are rotatable to each other and form a rolling chamber between each other, in which a set of rolling elements is arranged, wherein the bearing is arranged in a housing, which is adapted to seal off the bearing from an outside environment, and wherein a lubricant is encompassed inside the housing, wherein the housing further comprises at least one opening for providing a fluid passage from the inside of the housing to the outside, wherein the opening is fluid tightly connected to an oxygen removing element and/or to a gas tank which provides an oxygen sink for a free fluid contained within the inside of the housing.

3. The sealed bearing arrangement according to claim 2, wherein the oxygen removing element comprises zeolite and/or activated carbon and/or activated graphite.

4. A sealed bearing arrangement comprising:

at least a bearing with an outer ring and an inner ring that are rotatable with respect to each other and form a rolling chamber between each other, in which a set of rolling elements is arranged, wherein a lubricant is encompassed in the rolling chamber and the rolling chamber is sealed off from an environment by at least one sealing element, wherein the inner ring, the outer ring and/or the sealing element further comprises at least one opening for providing a fluid passage through the boundary of the sealed off rolling chamber wherein the opening is fluid tightly connected to an oxygen removing element, which provides an oxygen sink for a free fluid contained within the rolling chamber, wherein the oxygen removing element comprises a material which is adapted to absorb oxygen and releases absorbed oxygen based on a change of at least one physical parameter which impacts the oxygen removing element.

5. The sealed bearing arrangement according to claim 4, wherein the physical parameter is temperature and/or pressure.

6. A sealed bearing arrangement comprising:

at least a bearing with an outer ring and an inner ring that are rotatable with respect to each other and form a rolling chamber between each other, in which a set of rolling elements is arranged, wherein a lubricant is encompassed in the rolling chamber and the rolling chamber is sealed off from an environment by at least one sealing element, wherein the inner ring, the outer ring and/or the sealing element further comprises at least one opening for providing a fluid passage through the boundary of the sealed off rolling chamber wherein the opening is fluid tightly connected to an oxygen removing element, which provides an oxygen sink for a free fluid contained within the rolling chamber, wherein the oxygen removing element comprises a honeycomb structure.

7. A sealed bearing arrangement comprising:

at least a bearing with an outer ring and an inner ring that are rotatable with respect to each other and form a rolling chamber between each other, in which a set of rolling elements is arranged, wherein a lubricant is encompassed in the rolling chamber and the rolling chamber is sealed off from an environment by at least one sealing element, wherein the inner ring, the outer ring and/or the sealing element further comprises at least one opening for providing a fluid passage through the boundary of the sealed off rolling chamber wherein the opening is fluid tightly connected to a gas tank, which provides an oxygen sink for a free fluid contained within the rolling chamber, wherein the gas tank comprises nitrogen.

8. The sealed bearing arrangement according to claim 7, wherein the lubricant is grease.

* * * * *